United States Patent
Quase

[15] 3,674,687
[45] July 4, 1972

[54] STORM SEWAGE TREATMENT

[72] Inventor: Harold G. Quase, Rock Creek Hills, Kensington, Md.

[73] Assignee: Underwater Storage, Inc., Washington, D.C.

[22] Filed: Sept. 19, 1969

[21] Appl. No.: 859,390

[52] U.S. Cl. ................................210/86, 210/87, 210/152, 210/170, 210/172, 210/257, 210/258, 210/259, 137/236, 222/105
[51] Int. Cl. ................................................B01d 21/24
[58] Field of Search.....................210/86, 87, 152, 153, 170, 210/172, 195, 233, 257, 242, 258, 259; 222/23, 105; 137/236; 61/.5, 1

[56] References Cited

UNITED STATES PATENTS

| | | | |
|---|---|---|---|
| 2,154,132 | 4/1939 | Mallory | 210/86 X |
| 3,113,699 | 12/1963 | Crawford et al. | 222/23 |
| 3,155,280 | 11/1964 | Quase | 222/105 |
| 3,459,303 | 8/1969 | Bradley | 210/195 X |
| 3,497,062 | 2/1970 | Carlani, Jr. | 210/152 X |
| 3,572,506 | 3/1971 | Bandy et al. | 210/242 X |

OTHER PUBLICATIONS

Flow Measurement in Water and Sewage Works, Reference Number, Page R60, June 15, 1956

Primary Examiner—John Adee
Attorney—Littlepage, Quaintance, Wray & Aisenberg

[57] ABSTRACT

Street runoff or storm sewage is measured and solids are separated from the liquid first by a grit chamber and screen. Remaining solids are ground by a comminutor, and the fluid is pumped into large temporary storage tanks. The elongated low profile and wide storage tanks are preferably submerged in a body of water, and while sewage is in the tanks, air is continually bubbled upward through the tanks. When excess runoff has ceased, the storm sewage is pumped from the temporary storage tanks and purified before releasing it into a permanent dispersion media, such as a volume of water.

2 Claims, 6 Drawing Figures

INVENTOR
HAROLD G. QUASE

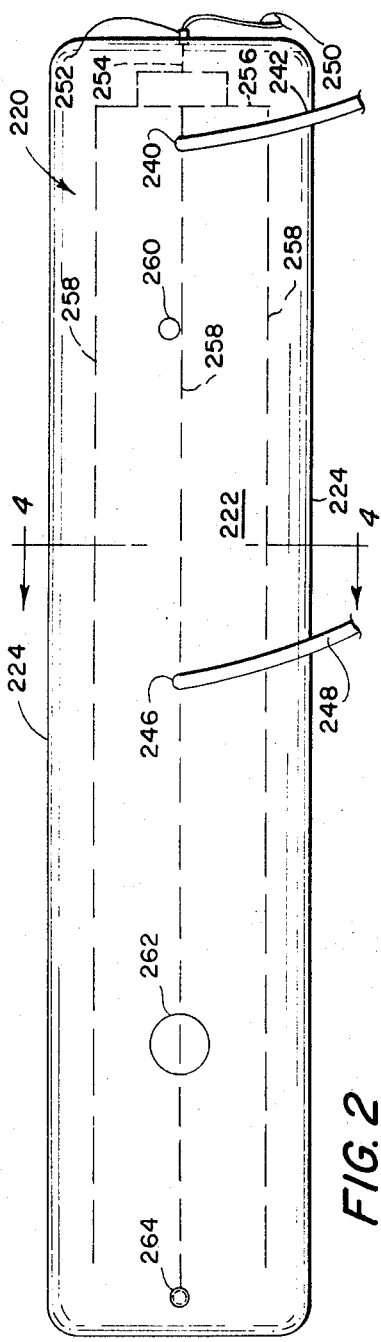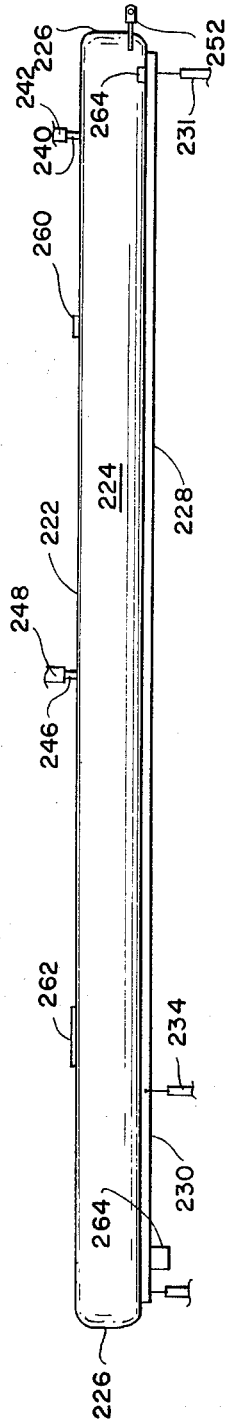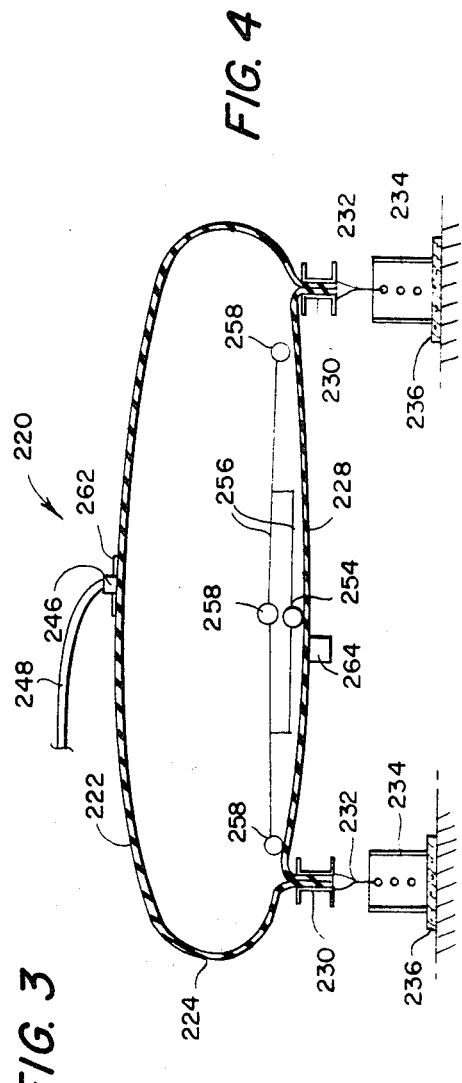

INVENTORS
HAROLD G. QUASE

STORM SEWAGE TREATMENT

BACKGROUND OF THE INVENTION

In many public and private installations, storm sewers empty into creeks, rivers, lakes, bays or oceans. Some storm sewer systems are interconnected with general sewage systems to deliver the street runoff to the main sewage system for treatment at a sewage treatment plant. Such systems usually employ overflow systems so that in periods of very heavy street runoffs excess runoff flows out of storm sewers into a river or other body of water. Both systems have the disadvantage of passing untreated storm sewer refuse directly to a body of water, which contaminates and pollutes that body of water.

Interconnected storm and waste sewage systems have the further disadvantage of raw sewage backing up into the storm sewer systems with the raw sewage and storm runoff intermingling and passing through overflows directly into bodies of water without treatment.

Copending patent application, Ser. No. 835,655, filed June 23, 1969, by Harold G. Quase, entitled "Underwater Storage", describes a system in which overflow storm sewage is stored in submerged flexible containers for later return to the storm sewers after the peak overflow loads have passed.

SUMMARY OF THE INVENTION

The present invention discloses a storm sewage processing plant which may be used for processing all storm sewage or street runoff. The system described in the present invention is particularly useful in processing excessive flows of storm sewage, or flows which are associated with peak periods of street runoff, such as during and immediately after heavy rainfalls. The system is completely self-contained so that the storm runoff is subjected to solid separation as well as to primary and secondary treatment so that a pure effluent is discharged into the waterways. Preferably, the plant of the present invention is provided with large temporary storage containers so that peak overloads may be facilitated. In a preferred form of the invention, the plant is located adjacent a waterway so that the large overflow containers may be submerged therein.

Preferably, all of the processed storm sewage is passed through a grit chamber to remove suspended particles, followed by a comminuting of any remaining particles so that a completely liquid form of storm sewage is handled, temporarily stored and treated before being dispersed.

Sewage flowing into the plant is measured for volume and rate of flow for determining which and how many processing lines to open. A large gate valve admits the sewage to the processing plant, and any excess sewage beyond that which may pass through the gate valve runs up a slight incline into a preliminary holding chamber. Such a preliminary storage chamber is not a limiting feature of the present system and systems may be designed without such storage chambers. A convenient form for a preliminary storage chamber is a preexisting overflow storm sewer which often is available adjacent a plant site when the plant is installed in a preexisting system. One example of a plant now in operation employs a preexisting 4 feet × 4 feet arched sewer which has been sealed at both ends.

The storm runoff passing through the gate valve and being admitted to the plant is passed into a valve chamber from whence it is directed by gate valves into either a first or second grit chamber for separation of suspended particles. During normal flow periods, a single grit chamber is employed. Upon excessive height and flow being noted upon the meter in the incoming sewer main, both grit chambers may be opened to the flow of the sewage. Both grit chambers are provided with sludge suction lines and flushing lines. One chamber may be flushed and its sludge pumped out while the other chamber is in operation, or sludge pumping may be continued while a grit chamber is in operation.

From the grit chambers, the fluid passes into a second valve chamber from whence it is directed into a comminutor which grinds any solid particles remaining in the fluid. A screen chamber is connected in parallel with the comminutor so that valves in the second valve chamber may reorient flow through the screen chamber, bypassing the comminutor for cleaning. During peak flow periods both the screen chamber and comminutor may be used simultaneously. Instead of the screen chamber, a second comminutor may be employed parallel to the first comminutor, or two screen chambers may be used in place of any comminutors.

Fluid sewage material from the separation apparatus may flow directly through drain lines into large temporary storage devices. A pump may be employed to pick up the fluid sewage and pump the fluid sewage into the storage devices. In a preferred form of the invention, the storage devices are large collapsible and flexible walled tanks which are submerged in a body of water, for example a river which flows by the storm treatment plant.

Using a single pump and a reversible flow service line for each storage tank, sewage may be pumped out of one tank while newly separated fluid flows by gravity into another storage tank. When gravity flows are not sufficient, parallel pumps may be provided with interconnections for service lines to each temporary storage tank so that one storage tank may be filled while another storage tank is emptied. The storage tanks may be bypassed, and the fluid sewage from the separation apparatus may be flowed at a controlled rate into secondary and tertiary sewage treatment facilities which may be located at the plant site or at a distant location. A portion of the fluid sewage from the separation apparatus may be flowed into the temporary storage tanks while another portion of the fluid sewage is flowed into the remote or local further treatment facility.

An air compressor at the plant pumps air into the base of the temporary storage tanks to encourage the development of aerobic bacteria in the tanks for the further digestion and purification of the fluid sewage. The air flowing through the tanks has the further purpose of maintaining fluid motion in the tanks to discourage the settlement of comminuted solids therein, to promote the removal of gaseous decay products, and to promote the solution and distribution of oxygen within the fluid sewage. Vents on the tanks are provided with pressure release valves to insure against excessive pressure buildup while permitting the tanks to have a pressure slightly greater than ambient pressure. In the case of submerged tanks, the ambient pressure is usually the pressure provided by about ten feet of water. The increased pressure aids in the solution of oxygen and in the decay and purification process. The slight increased pressures provided by the pressure release valves further promote that process and provide the stabilization of the flexible walled tanks.

The storm sewage which has been subjected to preliminary screening in the sewer main, sludge settling in the grit chambers and comminuting as well as aeration is then pumped to a filter bed and passes into a holding and testing tank where the complete purity of the effluent is ascertained before releasing the effluent into the environs.

Sludge from the grit chambers and filter bed may be pumped by a sludge pump to an interceptor sewer or into a sludge handling facility at the storm treatment plant.

The plant is completed by a water pump which selectively distributes untreated river water into the various areas of the treatment facility so that the individual elements may be flushed when they are not on-line.

The preferred temporary storage apparatus is a plurality of elongated and low profile substantially continuous flexible walled containers which are anchored under water. By releasing the anchor means and pressurizing empty bags with air, the containers may be surfaced for capturing the moving along a dockside for inspection and cleaning. The containers are provided with inspection and access hatches. Vent means are located in the central upper wall portion, and air distribution means are internally mounted near the lower walls. The air distribution means may comprise parallel perforated pipes which are interconnected by supply lines. The parallel pipes may operate in cooperation with the anchor means to maintain the low profile of the flexible containers by forming a generally planar lower wall surface. Alternatively, the flexible containers may be formed with parallel strongback means such as described in the cited copending application for promoting the low profile shape of the containers. Alternatively, shrouds may be placed over the upper walls of the bags to prevent the rising of the upper container surfaces beyond a given water surface clearance. Where appropriate, the river or lake bottom is dredged to insure the positioning of the flexible containers below the treatment plant, to insure the submergence and hence natural camouflage of the containers and to promote continued unobstructed water availability.

BRIEF DESCRIPTION OF THE DRAWINGS

FIG. 2 is a plan view of the flexible wall storage container.

FIG. 3 is a side elevation of the flexible wall storage container of FIG. 2.

FIG. 4 is a sectional view of the flexible wall storage container taken along line 44 of FIG. 2.

DETAILED DESCRIPTION OF THE DRAWINGS

Figure 1:
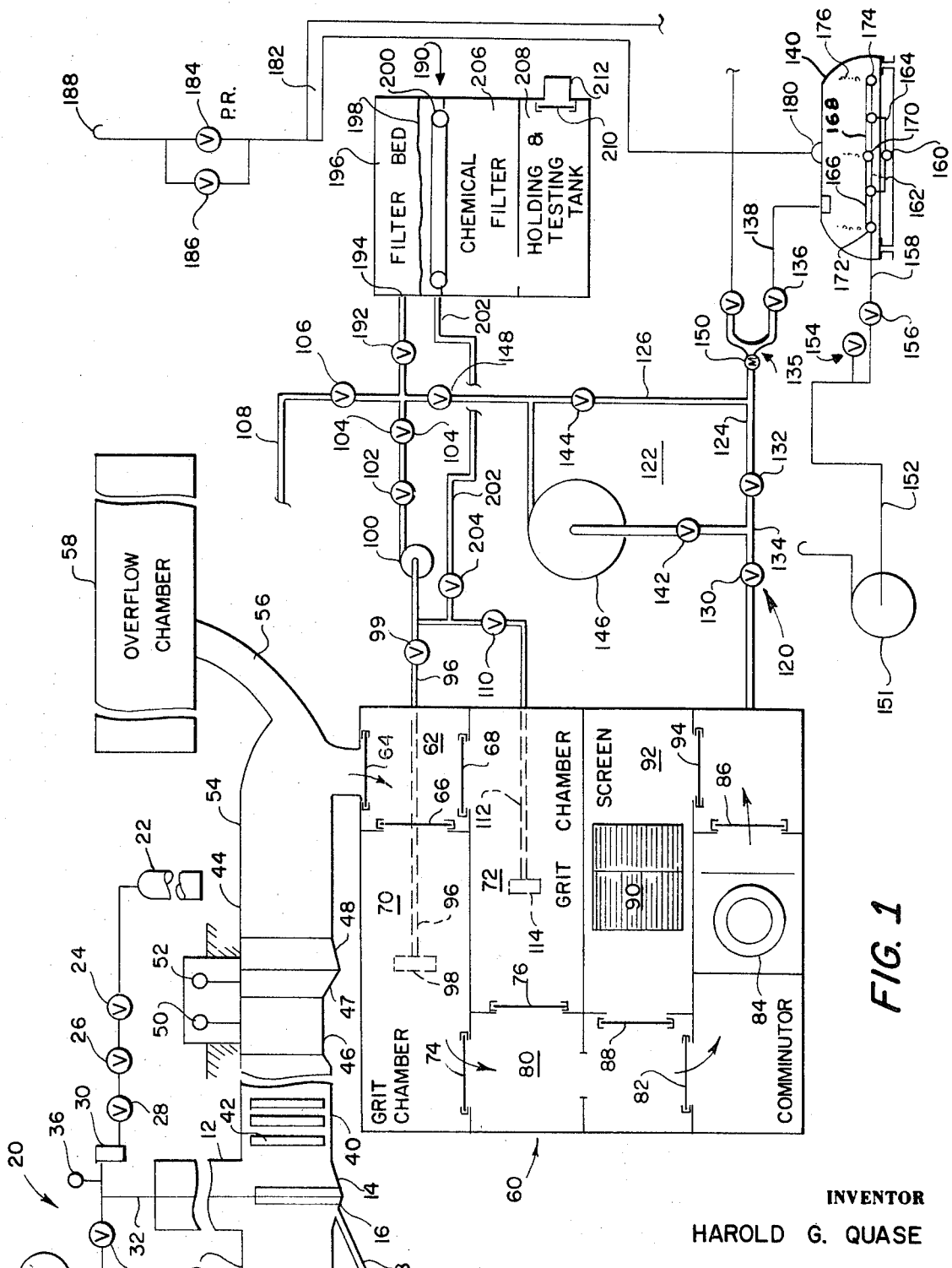
FIG. 1 is a schematic detail of the interrelated elements of the invention.

Referring to FIG. 1, a storm sewer main is identified by the numeral 10. Manhole 12 has a sump 14 with an opening 16 for connection of drain line 18 which leads to a large interceptor sewer. Although the system of the present invention may be constructed without the drain line 18, the drain line is shown in the present drawing as an indication of a conventional storm sewer system in which low flows are directed into the general sewage waste systems for treatment with the wastes. In a conventional manner, storm sewer main 10 is connected to a collection system which has preliminary intake screens for removing large refuse from the street runoff passing into the collection sewers and sewer main.

A measuring device generally indicated by the numeral 20 is provided in manhole 12 for measuring the height of sewage within the sewer main and manhole. A source of pressure 22, which is a nitrogen cylinder, feeds gas through a cylinder pressure regulator 24 and a line pressure regulator 26 to a gas flow rate valve 28. The nitrogen gas then flows through a gas flow meter 30 into a vertical tube 32, which supplies a 3-foot length of perforated 4-inch pipe at the bottom of tube 32. Pressure gauge 36 is provided in line 32, and a needle valve pulsation damper 38 isolates another pressure valve 39, which is calibrated in terms of sewage depth. The depth gauge apparatus 20 consequently indicates the depth of sewage within sump 14 and manhole 12.

The sewage then passes into a chamber 40 which is generally rectangular in cross section and which has a triangular arrangement of groups of vertical bars 42 which operate as a flow brake to absorb the velocity head of the storm sewage. From rectangular chamber 40 the sewage passes into a flume 44 which has a rectangular cross section. In a first section 46 the flume converges in horizontal direction. In a second section 47, the flume diverges vertically, and in a third section 48 the flume converges vertically while diverging horizontally. Stilling chambers are connected through restricted openings laterally of the flume and depth meters 50 and 52 measure the height of the sewage passing through the flume for an indication of volumetric flow. Chamber 54 directs the sewage into a separation unit which is generally identified by the number 60. Overflow channel 56 directs excessive sewage into overflow chamber 58 with the preferential direction of flow being toward separation unit 60. From channel 54 the sewage passes into a first valve chamber 62 which is controlled by inlet gate valve 64; flowing outward from valve chamber 62 through either gate valve 66 or 68, the sewage flows into one of two identical grit chambers 70 and 72. Flow of the sewage in the chambers of relatively large cross section is slowed and interrupted, and suspended particles fall out of the sewage and form sludge at the bottom of the grit chambers. Passing out of the respective chambers through gate valves 74 or 76, the sewage flows into a second valve chamber 80. When gate 82 is open, the sewage flows through a comminutor 84, which grinds all of the remaining suspended matter before exhausting the fluid through gate valve 86. When gate valve 88 is open, sewage flows through an inclined screen 90 in screen chamber 92 and out through gate valve 94. When grit chamber 70 is taken off line by closing gate valves 66 and 74, sludge may be pumped from the grit chamber through line 96 which terminates in a groove 98 in the floor of chamber 70. Line 96 is connected by valve 99 to the suction side of sludge pump 100 from whence sludge passes through check valve 102 and valves 104 and 106 to an exhaust line 108 which may be connected to the main waste interceptor sewer or to a local sludge disposal facility. When valve 99 is closed, and when chamber 72 has been taken off line, sludge valve 110 may be opened, allowing sludge to be drawn through line 112, which terminates in groove 114 in the base of grit chamber 72. Sludge may be pumped from either or both of the grit chambers while they are on line and in operation.

A conduit for receiving fluid sewage from the separation unit 60 is generally indicated by the numeral 120. Conduit 120 is provided with loop 122 which has a suction leg 124 and a discharge leg 126. When sewage is flowing from separation unit 60, valves 130 and 132 may be opened to allow the fluid sewage to flow along drain 134 to the temporary storage distribution system 135. When valve 136 is open, the fluid sewage flows through line 138 into flexible container 140. Alternatively, valve 132 may be closed and valves 142 and 144 may be opened to pump fluid sewage with sewage pump 146 through discharge leg 126 into the temporary storage containers 140.

Pump 146 is used to empty storage tanks 140 by closing valve 144 in the discharge leg 126 and opening valve 132 in suction leg 124 and by opening discharge valve 148. Flow meter 150 records the amount of fluid sewage pumped into the storage tanks 140 or pumped out of the storage tanks.

To insure breakdown of the sewage stored temporarily in tanks 140, a compressor 151 supplies compressed air through line 152 and distribution system 154, which includes valve 156, and through flexible air hoses 158 to the submerged container 140. Air enters a rigid pipe 160 and moves through supply pipe 162, 164, 166, and 168 before being released through parallel perforated pipes 170, 172 and 174, which extend longitudinally along a bottom of the tank. Air bubbles 176 cause currents within the tank which keep comminuted materials suspended within the sewage and which aid in the development of aerobic bacteria.

Vent 180 gathers gaseous decay products and air and passes the gases along line 182. Similar vent lines from all of the storage containers pass through a pressure release valve 184 which causes a positive pressure to be maintained within the flexible containers 140 to maintain the shape of the containers and thereby to facilitate the loading and emptying of the containers as well as the oxygen and gaseous flow through the containers and out of the vent. A manually operated valve 186 is connected in parallel with the pressure release valve for overriding the operation of that valve. Gases are deodorized and vented through vent 188. When a localized secondary treatment system 190 is employed, valve 192 is opened to connect the discharge of the sewage pump 146 to input 194 of filter bed 196. Coal or sand 198 is placed on a fixed base or conveyor 200. Sludge line 202 removes sludge from the bottom of the filter bed when valve 204 is open and when sludge pump 100 is in operation.

From filter bed 196, the fluid moves through chemical filter 206 into a holding and testing tank 208 where the purity of the final effluent is assured before releasing the water-like fluid through gate valve 210 in exhaust port 212.

A water pump is provided with permanent piping, valves and flexible hoses where appropriate for flushing all of the elemental portions of separation unit 60 of conduit 120 and of treatment facility 190.

One form of a temporary storage container used in the present invention is shown in FIGS. 2, 3 and 4. Storage container 220 is a flexible bag, having a generally rectangular planform. Preferably the container is made of a non-rigid material, such as natural or synthetic resins or fibers made therefrom or resin impregnated fabrics. Natural and synthetic rubbers, among which are acrylonitrile-butadiene, and fabrics impregnated therewith, are useful. Container 220 has curved and linearly joined wall portions which are upper wall portion 222, side wall portions 224, end wall portions 226 and bottom wall portion 228. The substantially continuous flexible covering which forms the container is clamped adjacent intersections of side and bottom wall portions with strongbacks 230. One or more of the strongback clamps may also act as a seal for edges of a flexible material which are placed therebetween. Cables 232 anchor the strongbacks 230 to pilings 234, which have been embedded in concrete 236 on the floor of the body of water. A flanged connection 240 in upper surface 222 near one end of the tank receives a 10-inch hose 242 for filling and emptying the container 220. A vent connection 246 at the center of upper surface 222 receives a flexible 1 ½-inch vent hose 248 for controlled ventilation of the container. An air distribution system is fed by a 1-inch air hose which is connected to quick connect and disconnect coupling 252 near the bottom of one end wall portion. Air is distributed within the container through a 1-inch main 254 and three-quarter-inch distribution pipes 256 to parallel perforated pipes 258 which run along the entire length of the bottom of the container. Perforated pipes 258 may be three inch diameter pipes having a one-thirty-second-inch hole in the top of the pipe at every half foot of length.

An inspection window 260 is provided in the upper surface of the container near one end thereof and a hinged access door 262 is provided in the other end of the container. Near both ends of the bottom of the container, one inch drains 264 are provided for draining the container.

Figure 5:
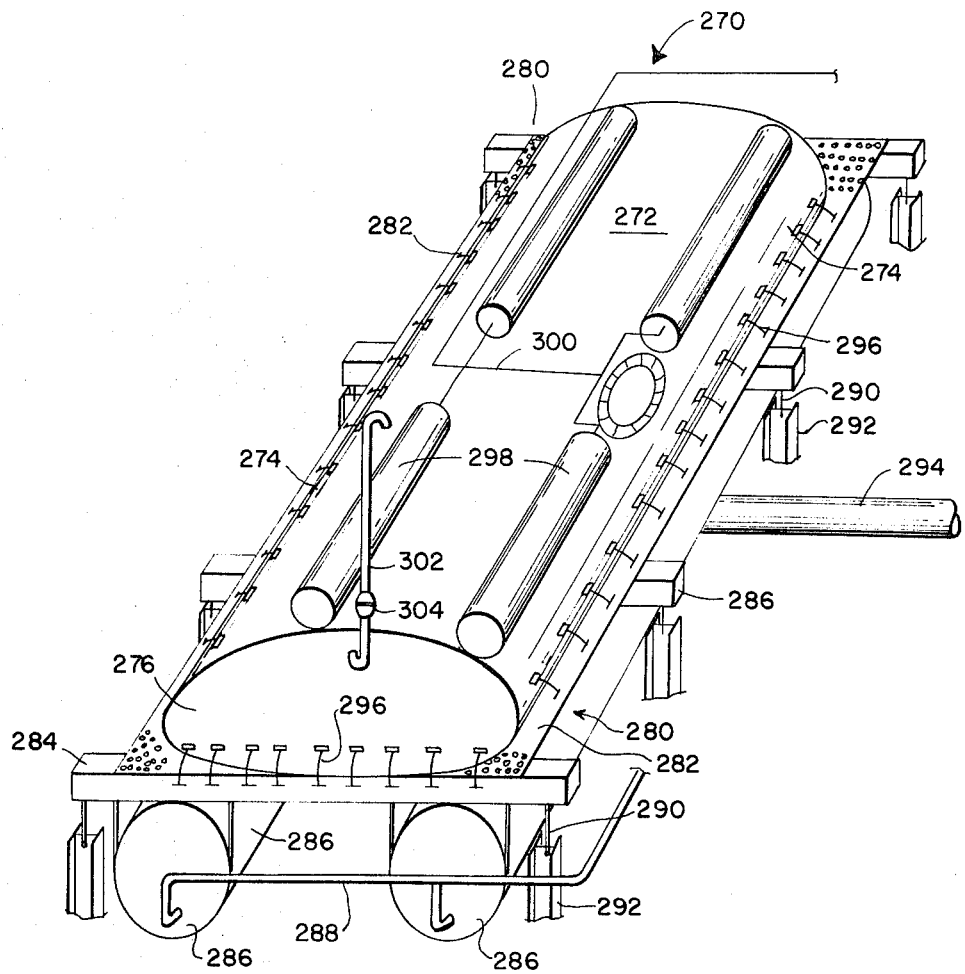
FIG. 5 is an alternate embodiment of a flexible storage tank.

An alternate embodiment of the flexible storage container is generally indicated by the numeral 270 in FIG. 5. The container is formed of a continuous flexible sheet with an upper wall portion 272, side wall portions 274 and end wall portions 276 and a bottom wall portion which rests upon a frame. Frame 280 comprises a flat platform 282 which rests upon cross pieces 284 which are in turn connected to flotation chamber means 286. Pipe lines 288 provide fluid connections to flotation chambers 286 for controlling the buoyancy of the container apparatus. Anchor lines 290 are connected between opposite ends of cross pieces 284 and H beams 292 which are embedded in the floor of the body of water in which container 270 is submerged. A main supply line 294 is connected to the bottom of container 270 for filling and emptying the container. Flexible securing means 296 interconnect the container side walls with the platform and end walls with end cross pieces for controlling the shape of the container and for maintaining its low profile. Buoyancy chambers 298 are supplied by an air distribution system 300 for stabilizing the shape of container 270, for raising and lowering the container, and for assisting in the filling and emptying of the container by raising and lowering the upper wall portion 272. A vent 302 is provided with a valve 304 for controlling the pressure within the tank.

Figure 6:
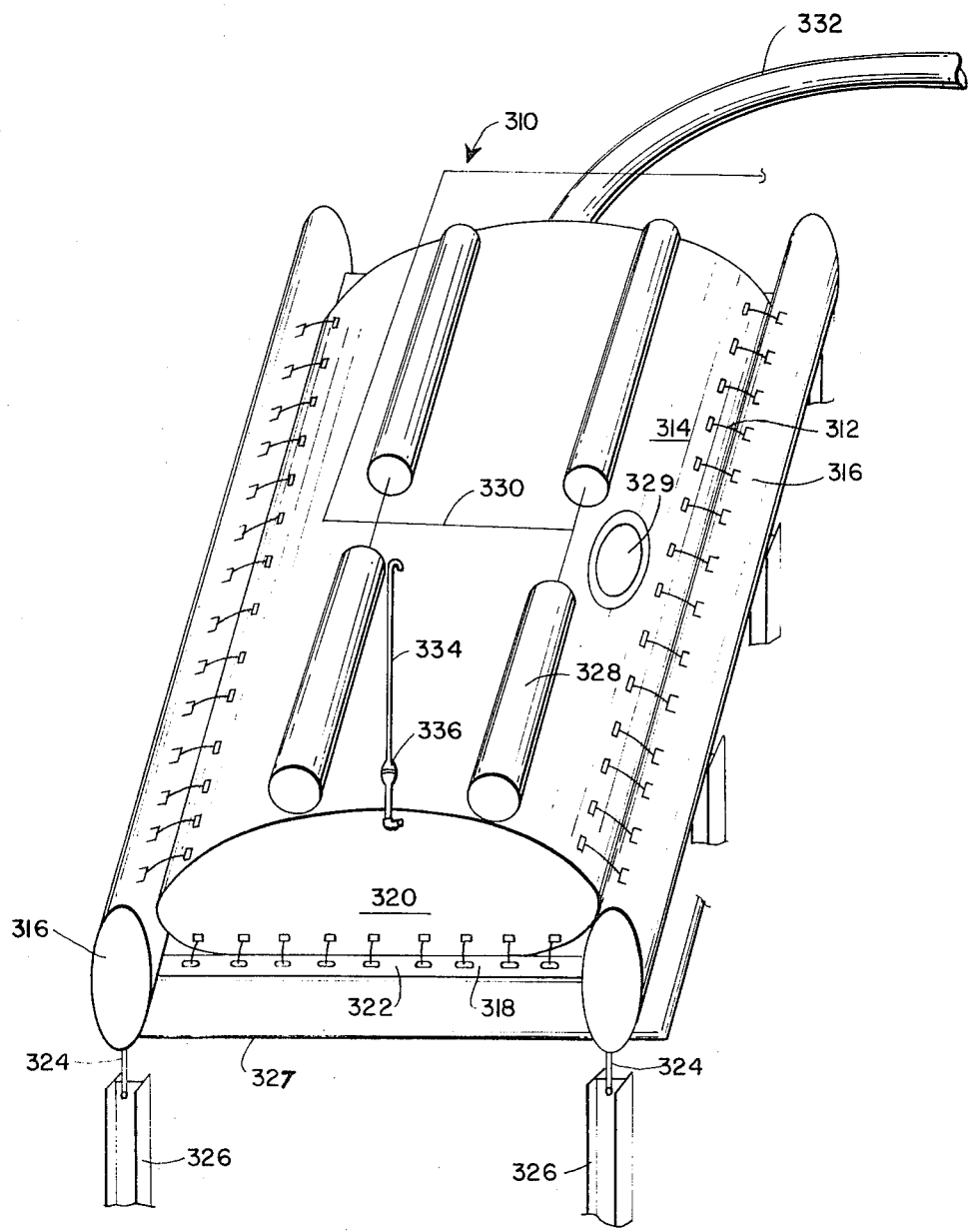
FIG. 6 is another alternate embodiment of a flexible storage tank.

Similar elements are found in the modified flexible and submergible container apparatus generally indicated by the numeral 310 in FIG. 6. Extensible and flexible securing devices 312 secure side wall portion 314 to parallel flotation chamber elements 316. Similar securing means 318 interconnect end wall portions 320 with platform members 322. Anchoring cables 324 are connected between bottoms of the flotation chambers 316 and tops of piles 326. Piping 327 provides fluid to the flotation chambers 316 for controlling the submergency of container 310. Chambers 328 are provided in the top of the bag for receiving air from control line 330 to stabilize container 310, to assist in the raising and lowering of the container and its upper surface. Pumping header 332 is connected to the bottom of the container for supplying and withdrawing material stored therein. An atmospheric vent 334 is connected near an upper surface of the container to release gas from the container. Valve 336 may be mounted in a flotation device which supports vent 334 above the surface of the water and which controls the release of pressure from the container. A manhole cover 329 provides access to the container.

That which is claimed is:

1. Storm sewage treatment apparatus comprising:
   sewer main means connected to collection means for receiving sewage therefrom;
   volumetric measuring means connected to the sewer main means for measuring sewage flow therein, the measuring means comprising (a) sewage depth measuring means connected to the sewer main means, (b) vertical chamber means connected to the sewer main means, (c) vertical tube means mounted in the vertical chamber means and having an opening near a lower end thereof, (d) regulated gas flow means connected to an upper end of the tube means, (e) a source of gaseous pressure means connected to the flow means, and (f) flow rate and pressure measuring means connected to the flow means for determining gas flow resistance from the tube means and hence sewage height in the vertical chamber means;
   separation means connected to the sewer main means for receiving sewage therefrom, and for removing particulate matter from the sewage;
   conduit means connected to the separation means for receiving liquid sewage therefrom;
   storage means connected to the conduit means for receiving liquid sewage therefrom, for temporarily storing the liquid sewage, and for returning the liquid sewage to the conduit means;
   pump means connected to the conduit means for moving liquid sewage therethrough; and
   discharge means connected to the conduit means for delivering sewage to a permanent sewage disposal means.

2. Storm sewage treatment apparatus comprising:
   sewer main means connected to collection means for receiving sewage therefrom;
   volumeric measuring means connected to the sewer main means for measuring sewage flow therein;
   separation means connected to the sewer main means for receiving sewage therefrom, and for removing particulate matter from the sewage;
   conduit means connected to the separation means for receiving liquid sewage therefrom;
   storage means connected to the conduit means for receiving liquid sewage therefrom, for temporarily storing the liquid sewage, and for returning the liquid sewage to the conduit means;
   pump means connected to the conduit means for moving liquid sewage therethrough; and
   discharge means connected to the conduit means for delivering sewage to a permanent sewage disposal means;
   the conduit means comprising loop means having suction and discharge leg portions and valve means in the leg portions; and
   the pump means being connected in the loop means for pumping sewage from the separation means to the storage means when valve means in the suction leg portion is closed, and for pumping sewage from the storage means to the discharge means when valve means in the suction leg is open and valve means in the discharge portion is closed.

* * * * *